United States Patent
Ma et al.

(10) Patent No.: US 9,609,329 B2
(45) Date of Patent: Mar. 28, 2017

(54) DYNAMIC VOLTAGE/FREQUENCY SCALING FOR VIDEO PROCESSING USING EMBEDDED COMPLEXITY METRICS

(71) Applicant: Samsung Electronics Co., LTD, Suwon-si, Gyeonggi-do (KR)

(72) Inventors: Zhan Ma, San Jose, CA (US); Felix C. A. Fernandes, Plano, TX (US); Mian Dong, Houston, TX (US); Xin Li, Dallas, TX (US); Sungoh Hwang, Gyeonggi-do (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 657 days.

(21) Appl. No.: 14/091,238

(22) Filed: Nov. 26, 2013

(65) Prior Publication Data
US 2014/0376618 A1   Dec. 25, 2014

Related U.S. Application Data

(60) Provisional application No. 61/857,543, filed on Jul. 23, 2013, provisional application No. 61/839,275, (Continued)

(51) Int. Cl.
*H04N 7/12* (2006.01)
*H04N 19/127* (2014.01)
(Continued)

(52) U.S. Cl.
CPC ........... *H04N 19/127* (2014.11); *H04N 19/14* (2014.11); *H04N 19/152* (2014.11); (Continued)

(58) Field of Classification Search
CPC .... H04N 19/127; H04N 19/14; H04N 19/152; H04N 19/177; H04N 19/179; H04N 19/46; H04N 19/70
(Continued)

(56) References Cited

U.S. PATENT DOCUMENTS

2002/0085489 A1\*  7/2002  Sartain ...................... G06F 5/06
                                                                        370/229
2003/0118112 A1   6/2003  Son et al.
(Continued)

OTHER PUBLICATIONS

Sjoberg, "Overview of HEVC High-Level Syntax and Reference Picture Management," IEEE Transactions on Circuits and Systems for Video Technology, vol. 22 No. 12, pp. 1858-1870, pub. Dec. 2012.\*

(Continued)

*Primary Examiner* — Jorge L Ortiz Criado
*Assistant Examiner* — Benjamin Pezzner

(57) ABSTRACT

A video decoder performs a method of dynamic voltage/frequency scaling (DVFS) for video processing. The method includes parsing a bitstream associated with a video to determine embedded information associated with a complexity of a first portion of the video, estimating the complexity of the first portion of the video using the embedded information, determining a voltage and frequency to be used for decoding the first portion of the video based on the estimated complexity, and decoding the first portion of the video at the determined voltage and frequency.

20 Claims, 7 Drawing Sheets

Related U.S. Application Data filed on Jun. 25, 2013, provisional application No. 61/839,271, filed on Jun. 25, 2013, provisional application No. 61/839,266, filed on Jun. 25, 2013.

(51) Int. Cl.
   *H04N 19/14* (2014.01)
   *H04N 19/70* (2014.01)
   *H04N 19/46* (2014.01)
   *H04N 19/152* (2014.01)
   *H04N 19/177* (2014.01)
   *H04N 19/179* (2014.01)

(52) U.S. Cl.
   CPC ......... *H04N 19/177* (2014.11); *H04N 19/179* (2014.11); *H04N 19/46* (2014.11); *H04N 19/70* (2014.11)

(58) Field of Classification Search
   USPC .................................................. 375/240.03
   See application file for complete search history.

(56) References Cited

U.S. PATENT DOCUMENTS

| | | |
|---|---|---|
| 2009/0112931 A1 | 4/2009 | Wang et al. |
| 2012/0042313 A1 | 2/2012 | Tam et al. |
| 2012/0066526 A1 | 3/2012 | Salsbery et al. |
| 2012/0151065 A1* | 6/2012 | Rintaluoma ......... H04N 19/127 709/226 |

OTHER PUBLICATIONS

International Search Report dated Oct. 7, 2014 in connection with International Patent Application No. PCT/KR2014/005656.
Written Opinion of International Searching Authority dated Oct. 7, 2014 in connection with International Patent Application No. PCT/KR2014/005656.

* cited by examiner

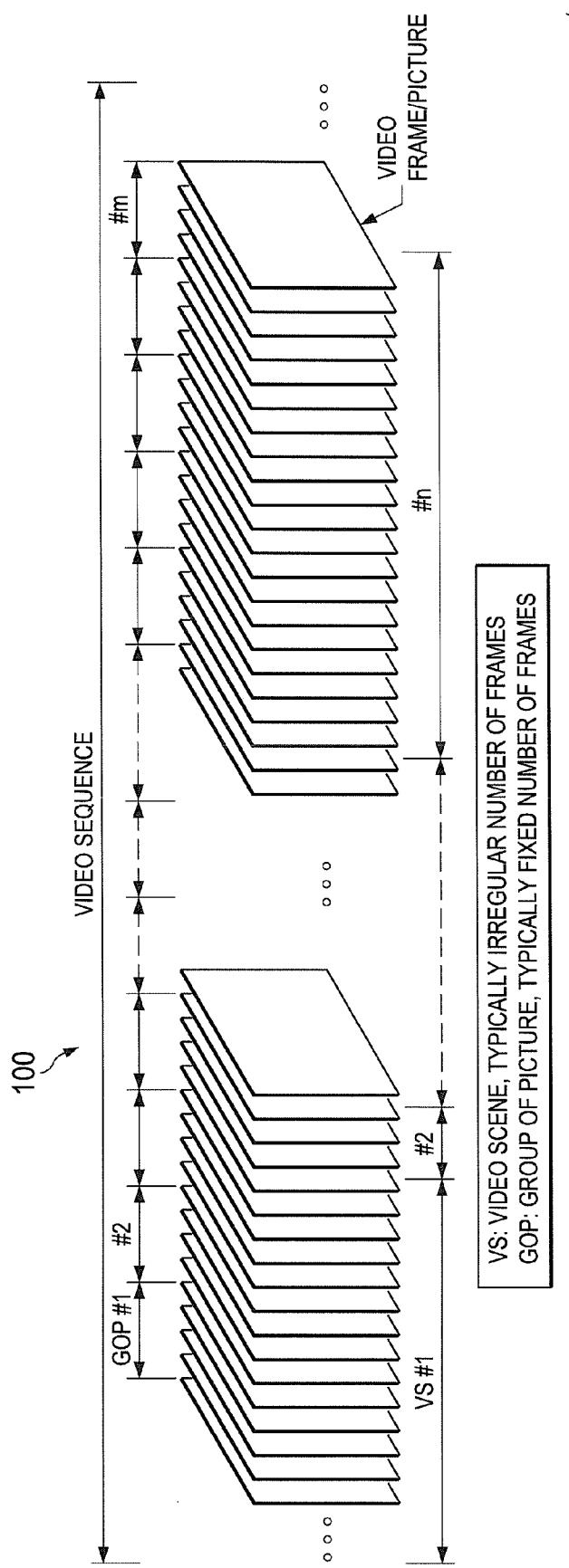
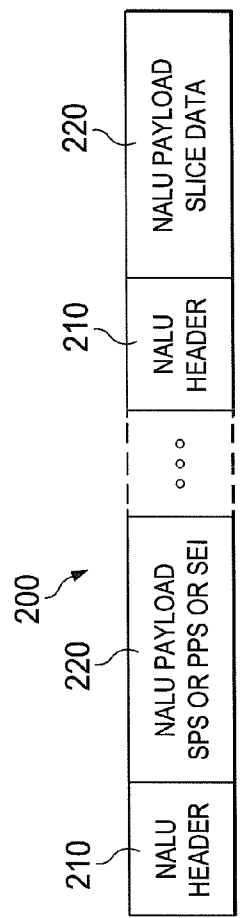
FIG. 1
FIG. 2

DYNAMIC VOLTAGE/FREQUENCY SCALING FOR VIDEO PROCESSING USING EMBEDDED COMPLEXITY METRICS

CROSS-REFERENCE TO RELATED APPLICATION(S) AND CLAIM OF PRIORITY

The present application claims priority to U.S. Provisional Patent Application Ser. No. 61/857,543, filed Jul. 23, 2013, entitled "DYNAMIC VOLTAGE/FREQUENCY SCALING FOR VIDEO PROCESSING USING SEI INFORMATION FOR SOFTWARE AND HARDWARE"; U.S. Provisional Patent Application Ser. No. 61/839,275, filed Jun. 25, 2013, entitled "DYNAMIC VOLTAGE/FREQUENCY SCALING FOR VIDEO PROCESSING USING SEI INFORMATION", U.S. Provisional Patent Application Ser. No. 61/839,271, filed Jun. 25, 2013, entitled "BUFFER ASSISTED DYNAMIC VOLTAGE/FREQUENCY SCALING FOR VIDEO PROCESSING"; and U.S. Provisional Patent Application Ser. No. 61/389,266, filed Jun. 25, 2013, entitled "DYNAMIC VOLTAGE/FREQUENCY SCALING FOR VIDEO PROCESSING WITH EXTENDED NAL UNIT". The contents of the above-identified patent documents are incorporated herein by reference.

TECHNICAL FIELD

The present application relates generally to video processing devices and, more specifically, to methods for dynamic voltage and frequency scaling for video processing in order to reduce power usage.

BACKGROUND

Power consumption is an increasingly critical issue for video-capable mobile devices, where video processing requires a significant amount of energy for video encoding, decoding and associated memory transfers. Video codecs in mobile devices can be implemented using either software on the CPU, such as an ARM (Advanced RISC Machines) platform, or hardware via dedicated ASIC (application specific integrated circuit) design. Recent advances in circuits design have demonstrated that power consumption can be reduced if circuits are placed into a low-power state, which uses a slower clock rate and a lower supply voltage.

SUMMARY

A method for dynamic voltage/frequency scaling (DVFS) for video processing is provided. The method includes parsing, at a decoder, a bitstream associated with a video to determine embedded information associated with a complexity of a first portion of the video; estimating, at the decoder, the complexity of the first portion of the video using the embedded information; determining, at the decoder, a voltage and frequency to be used for decoding the first portion of the video based on the estimated complexity; and decoding, at the decoder, the first portion of the video at the determined voltage and frequency.

An apparatus for DVFS for video processing is provided. The apparatus includes a video decoder. The video decoder is configured to parse a bitstream associated with a video to determine embedded information associated with a complexity of a first portion of the video; estimate the complexity of the first portion of the video using the embedded information; determine a voltage and frequency to be used for decoding the first portion of the video based on the estimated complexity; and decode the first portion of the video at the determined voltage and frequency.

A method for buffer-assisted dynamic voltage/frequency scaling (DVFS) for video processing is provided. The method includes determining, at a video receiver, a first clock frequency to be used for decoding a first portion of a video based on an estimated complexity of the first portion of the video; decoding, at the video receiver, the first portion of the video at the first clock frequency; loading, by the video receiver, the first portion of the video into a frame buffer until the frame buffer reaches a high threshold; displaying, at the video receiver, some of the first portion of the video stored in the frame buffer until the frame buffer reaches a low threshold; changing, at the video receiver, to a second clock frequency; and decoding, at the video receiver, a second portion of the video at the second clock frequency and loading the second portion of the video into the frame buffer.

Before undertaking the DETAILED DESCRIPTION below, it may be advantageous to set forth definitions of certain words and phrases used throughout this patent document: the term is "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates an example video sequence, according to an embodiment of this disclosure;

FIG. 2 illustrates a NALU (network abstraction layer unit) definition in H.264/AVC;

DETAILED DESCRIPTION

Figure 4:
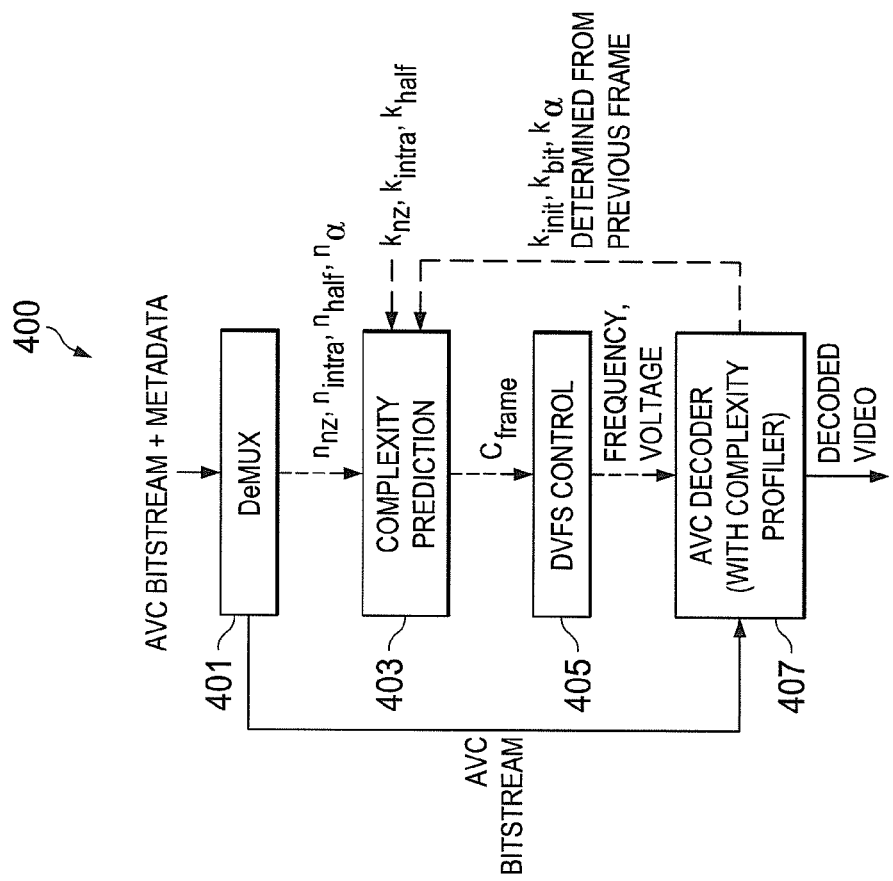
FIG. 4 illustrates a simplified parsing, complexity prediction, and DVFS control process, according to an embodiment of this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (i) Zhan Ma, Hao Hu, and Yao Wang, "On Complexity Modeling of H.264/AVC Video Decoding and Its Application for Energy Efficient Decoding", IEEE Trans. Multimedia, vol. 13, no. 6, pp. 1240-1255, December 2011 (hereinafter "REF1"); J. M. Rabaey. Digital Integrated Circuits. Prentice Hall, 1996 (hereinafter "REF2"); V. Sze, D. F. Finchelstein, M. E. Sinangil, A. P. Chandrakasan, "A 0.7-V 1.8-mW H.264/AVC 720p Video Decoder," IEEE Journal of Solid State Circuits (JSSC), A-SSCC Special Issue, Vol. 44, No. 11, pp. 2943-2956, November 2009 (hereinafter "REF3"); D. Son, C. Yu, and H. Kim, "Dynamic Voltage Scaling on MPEG Decoding", International Conference of Parallel and Distributed System (ICPADS), June 2001 (hereinafter "REF4"); B. Lee, E. Nurvitadhi, R. Dixit, C. Yu, and M. Kim, "Dynamic Voltage Scaling Techniques for Power Efficient Video Decoding," Journal of Systems Architecture, Vol. 41, Issues 10-11, pp. 633-652, November 2005 (hereinafter "REF5"); Z. Ma, M. Xu, Y.-F. Ou, and Y. Wang, "Modeling Rate and Perceptual Quality of Video as Functions of Quantization and Frame Rate and Its Applications," IEEE Trans. CSVT, November 2011 (hereinafter "REF6"); and "Recommendation ITU-T H.264 or equivalently ISO/IEC 14496-10, Information technology—Coding of audio-visual objects—Part 10: Advanced Video Coding" (hereinafter "REF7"); and "Recommendation ITU-T H.265 or equivalently ISO/IEC 23008-2 MPEG-H Part 2 (hereinafter "REF 8").").

FIG. 1 illustrates an example video sequence, according to an embodiment of this disclosure. The embodiment of the video sequence 100 illustrated in FIG. 1 is for illustration only. Other embodiments could be used without departing from the scope of this disclosure.

A video sequence is a time serial representation of two-dimensional (2D) images (or frames or pictures). As shown in FIG. 1, a basic unit for the video sequence 100 is the video frame (or picture). In addition, a group of pictures (GOP), represented by GOP #1 and GOP #2, is a commonly used unit which usually includes a fixed number of frames for encoding. Each video sequence may include multiple video scenes (VS). Each video scene contains video content that may be quite different from other video scenes. Each video scene typically includes a different number of frames.

Power consumption at a video decoder is proportional to CPU voltage and frequency, as shown in the following relationship:

$$P_{dyn} \propto V^2 f$$

Accordingly, recent advances in circuit design have demonstrated that power consumption can be reduced if circuits are placed into a low-power state, which uses a slower clock rate (or frequency) and a lower supply voltage. Such technology is generally referred as Dynamic voltage/frequency scaling (DVFS). (See also REF2.) DVFS can be implemented on both software implementation on CPU and hardware implementation on ASIC. (See also REF1 and REF3.)

Research also shows that there is a large complexity variation for video frame processing. For example, decoding of different types of frames may require significantly different clock rates. On some low-complexity frames, it may be possible to run the decoder CPU at a lower frequency to save power. Therefore, it is helpful to apply the DVFS with video processing so as to save computing energy during decoding. To control the DVFS, accurate video processing complexity estimation is highly important. Some systems have been described which implement the DVFS with MPEG video decoding. (See REF4 and REF5.) However, such systems require training, and the associated computing time is simply given in terms of the bitstream length. Such a relationship is rough and not accurate, especially for practical implementation.

None of the described systems use supplemental enhancement information (SEI) to guide the DVFS for video decoding. SEI comprises extra information that can be inserted into the bitstream to enhance the use of the video for a wide variety of purposes. Likewise, none of the described systems extend the NALU (network abstraction layer unit) header to guide the DVFS for video decoding. Such SEI and NALU header messages can be easily derived and encapsulated at the video encoder.

In this disclosure, various embodiments are described in which video content complexity information is embedded into the bitstream as metadata. In one embodiment, the video content information is embedded using SEI syntax. In another embodiment, the video content information is embedded using NALU header syntax. The SEI syntax or NALU syntax can be parsed at the decoder to support the complexity prediction so as to guide the DVFS for energy saving. The SEI or NALU header messages are derived at the encoder during video encoding.

Such SEI messages and NALU header information may be embedded in media systems embodiments to support DVFS for energy saving. Some embodiments described in this disclosure comprise a software-implemented H.264/AVC decoder on the CPU. However, the embodiments are not limited thereto, and can also be applicable to a hardware codec.

The DVFS-enabling SEI message or NALU header message (e.g., complexity_estimator( )) can be inserted into the bitstream on a frame-by-frame, GOP-by-GOP, scene-by-scene, or even time-interval-by-time-interval basis, depending on the underlying applications. That is, the SEI message or NALU header message can be inserted once at the start of each frame, GOP, scene, or time interval. In comparison to a frame-level inserted message, a GOP-interval, scene-interval, or time-interval inserted message requires less overhead for message insertion. For processors that don't support high-frequency DVFS (e.g., adapting at 33 ms for 30 Hz video playback), setting period_type to a GOP, or time-interval may be advantageous to setting the upcoming period to a frame.

In an embodiment where video content information is embedded using SEI syntax, a new SEI message with a payloadType=54 is defined in H.264/AVC as shown in Table 1. It will be understood that the value 54 is just one example value. Any available number can be selected. The new SEI message is interpreted at the decoder. Each time the decoder parses the new SEI message, the decoder enables a frame-level, GOP-level, scene-level, or time interval-level complexity estimation, as defined in Table 2.1. As shown in Table 2, the complexity metrics include the number of non-zero macroblocks, the number of intra-coded macroblocks, the number of half-pel interpolations, and the number of alpha point de-blocking instances.

To determine the number of half-pel interpolations, note that each half-pel interpolation requires a 6-tap filtering operation, as defined in REF7. At the encoder, given the motion vector of each block, the number of 6-tap filtering operations (and hence the number of half-pel interpolations) is easily determined.

To determine the number of alpha point deblocking instances, the notation defined in REF7 is first used to define an alpha point deblocking instance as a single filtering operation that produces either a single, filtered output $p'_0$ or a single, filtered output $q'_0$ where $p'_0$ and $q'_0$ are filtered samples across a 4×4 block edge. Therefore the number of alpha point deblocking instances is the total number of filterin, operations applied to produce filtered samples of the type $p'_0$ or $q'_0$.

In the embodiment shown in Table 2, period_type indicates the type of upcoming period over which the four complexity metrics are applicable. For period_type=0, 1, 2, 3, the complexity metrics will be respectively applicable over a single frame, a single GOP, a specified time-interval (in seconds) or a specified number of frames. When the period_type is 2 or 3, then it can signal the duration of a scene over which the complexity metrics are applicable. When period_type is 2, num_seconds specifies the number of seconds over which the complexity metrics are applicable. When period_type is 3, num_frames specifies the number of frames over which the complexity metrics are applicable.

In the embodiment shown in Table 2.1, two bytes are used for each complexity metric when period_type is 0 or 1 and four bytes are used for each complexity metric when period_type is 2 or 3. This embodiment reduces signaling overhead for short-duration periods.

In the embodiment shown in Table 2.2, only two types of periods are signaled. When period_type is 0, the complexity metrics are applicable over a single GOP and when period_type is 1, the complexity metrics are applicable over a specified interval which is signaled in seconds and also in also in a specified number of frames. It will be understood that other combinations of the embodiments described above may also be used without departing from the scope of this disclosure. For example, the embodiment of Table 2.2 may be modified so that the complexity metrics are applicable over a single GOP, specified number of seconds or specified number of frames.

The SEI message containing the complexity metrics is transmitted at the start of an upcoming period. The next SEI message containing complexity metrics will be transmitted at the start of the next upcoming period. Therefore, when the upcoming period is a frame or GOP, SEI messages will be transmitted for each frame or GOP, respectively. When the upcoming period is a specified time interval, the associated SEI message is transmitted with the first frame in the interval. When the upcoming period is a specified number of frames, the associated SEI message is transmitted with the first frame. The same signaling protocol is applied when using extended NAL units.

In certain embodiments, each metric is stored in four bytes; thus the total overhead for all four metrics (4 metrics×4 bytes=16 bytes) is negligible. Once all four metrics are obtained, the decoder estimates the complexity for the next frame, GOP, scene, or time interval. This complexity estimation is then used to adjust the voltage and frequency for the upcoming period.

In another embodiment, the video content information is embedded using NALU header syntax. FIG. 2 illustrates a NALU definition in H.264/AVC. As shown in FIG. 2, a NALU 200 includes two parts, a NALU header 210 and a NALU payload 220. The NALU header 210 may be parsed at the decoder for decoding operations. For example, if the NALU header 210 indicates that the NALU 200 is a SPS (sequence parameter set) or a PPS (picture parameter set), then SPS or PPS parsing and initialization will be performed. Alternatively, if the NALU header 210 indicates that the NALU 200 is a slice NALU, then slice decoding is performed.

In H.264/AVC and its extensions, the NALU 200 is byte-aligned. The NALU header 210 may be either one (1) byte or four (4) bytes, depending on whether the NALU 200 is a regular single layer packet or a scalable packet. Table 3 shows the NALU syntax and its parsing process for H.264/AVC and its extensions.

Table 3 illustrates a syntax for a NALU header, such as the NALU header 210. As shown in Table 3, a normal 1-byte NALU header includes a one-bit forbidden_zero_bit field (which is always zero), a three-bit nal_ref_idc field indicating whether the NALU can be referred, and a five-bit nal_unit_type field showing the exact type of the following NALU payload. If the nal_unit_type field has a value between 14 and 20 inclusive, an extra three bytes are parsed to derive additional information associated with H.264 scalable video. As shown in Table 4, H.264/AVC defines various nal_unit_type values for appropriate parsing and decoding, where values from 24 to 31 are unspecified.

In accordance with the disclosed embodiment, a new nal_unit_type=24 is defined in H.264/AVC, as shown in Table 5. It will be understood that the value 24 is just one example value. Any available number can be selected. The new nal_unit_type=24 indicates the complexity associated information. When nal_unit_type=24, complexity_estimator( ) is used to parse and initialize the decoding complexity prediction related data. Each time the decoder parses the NALU header, the decoder enables a frame-level, GOP-level, scene-level, or time interval-level complexity estimation, as defined in Table 5. As shown in Table 5, the complexity metrics include the number of non-zero macroblocks, the number of infra coded macroblocks, the number of half-pel interpolations, and the number of alpha point de-blocking instances. Once all four metrics in Table 2 are obtained, the decoder estimates the complexity for the next frame, GOP, or time interval as indicated by period_type. This complexity is then used to adjust the voltage and frequency for the upcoming period. Tables 5 and 6 illustrate the modification to extend the current NALU header definition to support complexity information embedding. Note that the extended NAL-unit embodiment shown in Table 5 corresponds to the SET-message embodiment shown in Table 2. It is also possible to create NAL-unit embodiments that correspond to the SEI-message embodiments shown in Tables 2.1, 2.2, and permutations, combinations and modifications, thereof.

FIG. 4 illustrates a simplified parsing, complexity prediction, and DVFS control process, according to an embodiment of this disclosure. The embodiment of the process 400 illustrated in FIG. 4 is for illustration only. Other embodiments could be used without departing from the scope of this disclosure.

In operation 401, a decoder parses the packetized h.264/AVC bitstream. The parsing may include either SEI message parsing or NALU header parsing. Each time the SEI message or NALU header is encountered by the decoder, a new upcoming period begins. The value period_type indicates whether the new upcoming period is a single frame, a single GOP, or a time interval (specified in seconds or number of frames). Assuming that the upcoming period is a single frame, as shown in FIG. 4, the SEI message or NALU header is parsed to derive the complexity parameters, such as num_non_zero_macroblockss ($n_{nz}$), the num_intra_coded_macroblocks ($n_{intra}$), the num_half_pel_interpolations ($n_{six}$) and num_alpha_point_deblocking ($n_\alpha$). Once the complexity parameters are derived, the total frame complexity is estimated or predicted according to Equation 1 (operation 403):

$$C_{frame}=k_{init}n_{MB}+k_{bit}n_{bit}+k_{nz}n_{nz}+k_{intra}n_{intra}+k_\alpha n_\alpha \quad (1)$$

where $C_{frame}$ is the total frame complexity. The number of total macroblocks per frame ($n_{MB}$) and the number of bits per frame ($n_{bit}$) can be easily obtained after de-packetizing the encapsulated packets (for example, NAL units) and parsing the sequence parameter set. Constants $k_{init}$, $k_{bit}$, $k_{nz}$, $k_{intra}$, and $k_\alpha$ are unit complexity constants for performing macroblock initialization (including parsed data filling and prefetching), single-bit parsing, non-zero block transform and quantization, intra block prediction, inter-block half-pel interpolation, and deblocking alpha points filtering, respectively (see also REF1). Based on extensive simulations, it is recognized that $k_{nz}$, $k_{intra}$, and $k_{six}$ are fixed constants for a typical platform, while $k_{init}$, $k_{bit}$, and $k_\alpha$ can be accurately estimated using a linear predictor from a previous decoded frame.

Once the frame complexity is determined, the decoder applies DVFS to determine a suitable clock frequency and supply voltage for the decoder (operation 405). Then, in operation 407, the decoder can decode the video frame at the appropriate clock frequency and supply voltage.

While FIG. 4 is illustrated with respect to determining a total frame complexity $C_{frame}$, various changes may be made to FIG. 4. For example, analogous complexity estimations for a total GOP ($C_{GOP}$), scene ($C_{scene}$), or time interval ($C_{interval}$) can also be determined using Equation (1) and FIG. 4.

Figure 5:
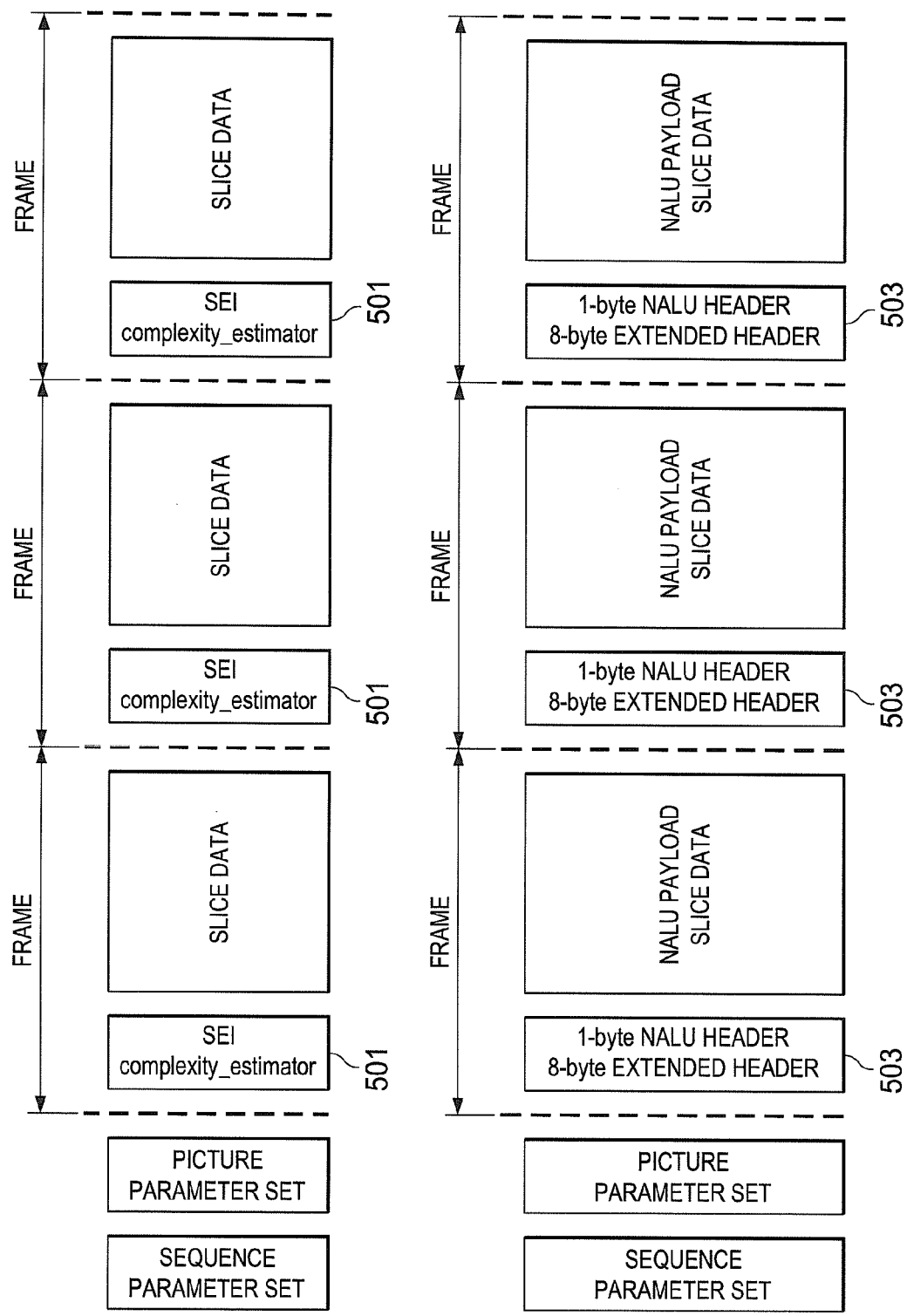
FIGS. 5 and 6 illustrate encapsulation of complexity metadata in a video sequence, according to embodiments of this disclosure.
Figure 6:
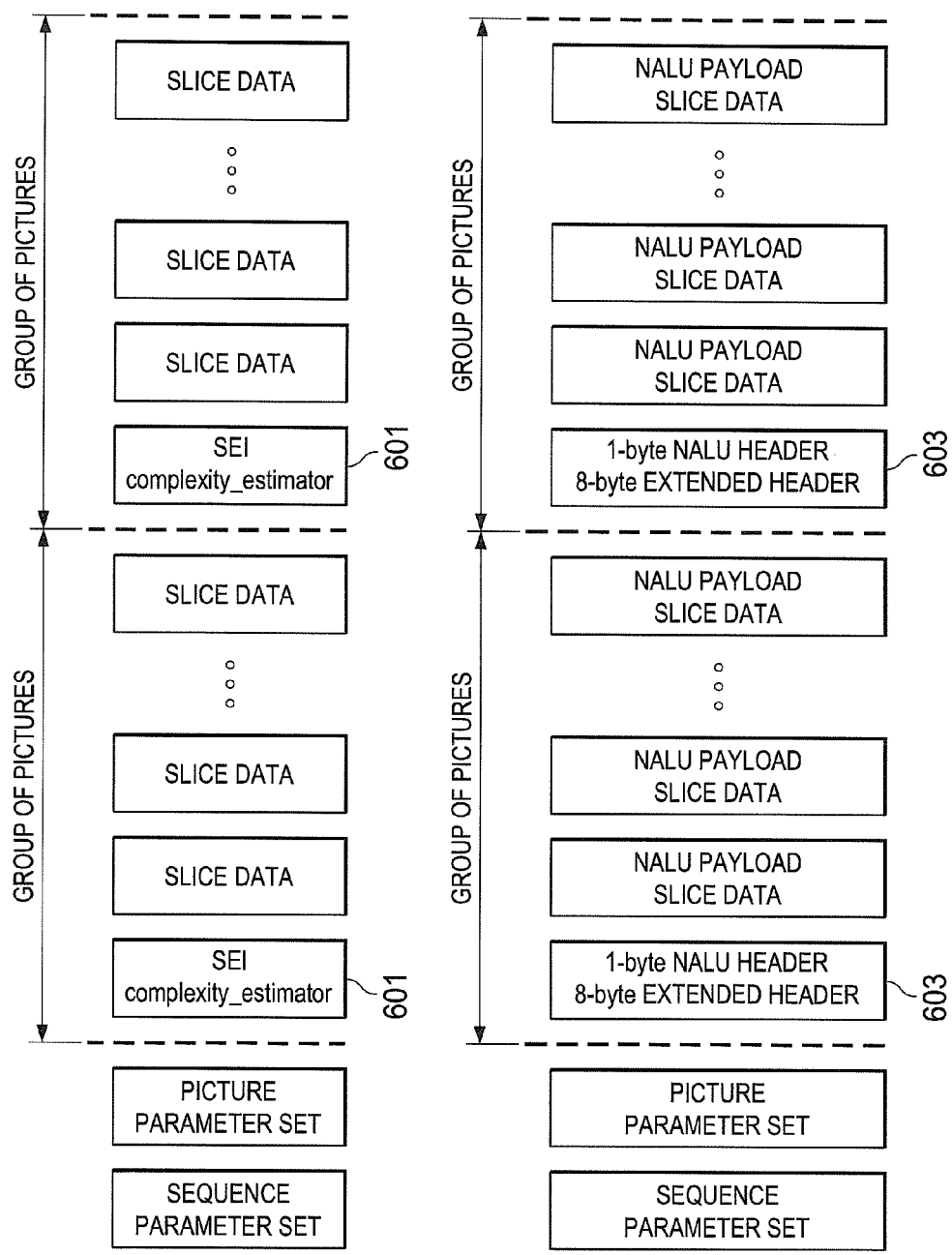

FIGS. 5 and 6 illustrate encapsulation of complexity metadata in a video sequence, according to embodiments of this disclosure. The embodiments illustrated in FIGS. 5 and 6 are for illustration only. Other embodiments could be used without departing from the scope of this disclosure.

As shown in FIG. 5, the complexity metadata may be encapsulated in a SEI message 501 at the start of each frame. Alternatively, the complexity metadata may be encapsulated in a NALU header 503 at the start of each frame. In another embodiment, the complexity metadata may be included at the GOP level. For example, as shown in FIG. 6, the complexity metadata may be encapsulated in a SEI message 601 at the start of each GOP. Alternatively, the complexity metadata may be encapsulated in a NALU header 603 at the start of each GOP.

Although FIGS. 5 and 6 depict certain examples of encapsulation of complexity metadata in a video sequence, various changes may be made to FIGS. 5 and 6. For example, the complexity metadata may be included at the start of every scene or predetermined time interval, instead of at the start of every frame or GOP. Likewise, the complexity metadata may be encapsulated at the end of, or in the middle of, every frame, GOP, scene, or time interval, instead of at the beginning.

In a hardware (ASIC) embodiment, instead of deriving decoding complexity and using it directly to control a single clock frequency in a DVFS scheme, the ASIC can be designed so that it includes several distinct clock domains, each of which corresponds to one of the terms in Equation (1). Greater power reduction can be obtained by using such a flexible ASIC with distinct clock domains. In one embodiment, six (6) clock domains in the ASIC control the following six (6) sections of the ASIC: macroblock initialization, bit parsing, transform and quantization, intra-block prediction, interpolation, and deblocking. To achieve fine-grained DVFS adjustments, the clock frequencies in each domain may be varied in proportion to the corresponding term in Equation (1). Accordingly, the preceding clock domains can have instantaneous clock frequencies that are respectively proportional to the following terms: $k_{init}n_{MB}$, $k_{bit}n_{bit}$, $k_{nz}n_{nz}$, $k_{intra}n_{intra}$, $k_{six}n_{six}$, and $k_\alpha n_\alpha$.

It will be understood that this method of DVFS control over several distinct clock domains may be applied to any grouping of metadata terms. Equation (1) is merely one example of such a grouping.

The embodiments disclosed hereinabove exemplify DVFS control in implementations using a SEI message or extended NALU header in the context of REF7. Without departing from the scope of this disclosure, it will be understood by one skilled in the art, that these embodiments may also be implemented in the context of REF8 or other similar standards. However, this disclosure is not limited thereto. In other embodiments, any information derived from the encoder can be embedded in a SEI message or extended NALU header to help the decoder DVFS. In still other embodiments, information can be derived by analyzing the underlying input video, such as motion activities, pixel histogram, contrasts, and the like.

TABLE 1

| SEI messages defined in H.264/AVC | | |
|---|---|---|
| sei_payload( payloadType, payloadSize ) { | C | Descriptor |
| if( payloadType == 0 ) | | |
|   buffering_period( payloadSize ) | 5 | |
| else if( payloadType == 1 ) | | |
|   pic_timing( payloadSize ) | 5 | |
| else if( payloadType == 2 ) | | |
|   pan_scan_rect( payloadSize ) | 5 | |
| else if( payloadType == 3 ) | | |
|   filler_payload( payloadSize ) | 5 | |
| else if( payloadType == 4 ) | | |
|   user_data_registered_itu_t_t35( payloadSize ) | 5 | |

TABLE 1-continued

SEI messages defined in H.264/AVC

| sei_payload( payloadType, payloadSize ) { | C | Descriptor |
|---|---|---|
| else if( payloadType = = 5 ) | | |
|   user_data_unregistered( payloadSize ) | 5 | |
| else if( payloadType = = 6 ) | | |
|   recovery_point( payloadSize ) | 5 | |
| else if( payloadType = = 7 ) | | |
|   dec_ref_pic_marking_repetition( payloadSize ) | 5 | |
| else if( payloadType = = 8 ) | | |
|   spare_pic( payloadSize ) | 5 | |
| else if( payloadType = = 9 ) | | |
|   scene_info( payloadSize ) | 5 | |
| else if( payloadType = = 10 ) | | |
|   sub_seq_info( payloadSize ) | 5 | |
| else if( payloadType = = 11 ) | | |
|   sub_seq_layer_characteristics( payloadSize ) | 5 | |
| else if( payloadType = = 12 ) | | |
|   sub_seq_characteristics( payloadSize ) | 5 | |
| else if( payloadType = = 13 ) | | |
|   full_frame_freeze( payloadSize ) | 5 | |
|     else if( payloadType = = 14 ) | | |
|   full_frame_freeze_release( payloadSize ) | 5 | |
| else if( payloadType = = 15) | | |
|   full_frame_snapshot( payloadSize ) | 5 | |
|   else if( payloadType = = 16 ) | | |
|   progressive_refinement_segment_start( payloadSize ) | 5 | |
|   else if( payloadType = = 17 ) | | |
|   progressive_refinement_segment_end( payloadSize ) | 5 | |
|   else if( payloadType = = 18 ) | | |
|   motion_constrained_slice_group_set( payloadSize ) | 5 | |
|   else if( payloadType = = 19 ) | | |
|   film_grain_characteristics( payloadSize ) | 5 | |
|   else if( payloadType = = 20 ) | | |
|   deblocking_filter_display_preference( payloadSize ) | 5 | |
|   else if( payloadType = = 21 ) | | |
|   stereo_video_info( payloadSize ) | 5 | |
|   else if( payloadType = = 22 ) | | |
|   post_filter_hint( payloadSize ) | 5 | |
|   else if( payloadType = = 23 ) | | |
|   tone_mapping_info( payloadSize ) | 5 | |
|   else if( payloadType = = 24 ) | | |
|   scalability_info( payloadSize )/* specified in Annex G */ | 5 | |
|   else if( payloadType = = 25 ) | | |
|   sub_pic_scalable_layer( payloadSize ) /* specified in Annex G */ | 5 | |
|   else if( payloadType = = 26 ) | | |
|   non_required_layer_rep( payloadSize ) /* specified in Annex G */ | 5 | |
|   else if( payloadType = = 27 ) | | |
|   priority_layer_info( payloadSize ) /* specified in Annex G */ | 5 | |
|   else if( payloadType = = 28 ) | | |
|   layers_not_present( payloadSize ) /* specified in Annex G */ | 5 | |
|   else if( payloadType = = 29 ) | | |
|   layer_dependency_change( payloadSize ) /* specified in Annex G */ | 5 | |
|   else if( payloadType = = 30 ) | | |
|   scalable_nesting( payloadSize )/* specified in Annex G */ | 5 | |
|   else if( payloadType = = 31 ) | | |
|   base_layer_temporal_hrd( payloadSize ) /* specified in Annex G */ | 5 | |
|   else if( payloadType = = 32 ) | | |
|   vquality_layer_integrity_check( payloadSize ) /* specified in Annex G */ | 5 | |
|   else if( payloadType = = 33 ) | | |
|   redundant_pic_property( payloadSize ) /* specified in Annex G */ | 5 | |
|   else if( payloadType = = 34 ) | | |
|   tl0_dep_rep_index( payloadSize ) /* specified in Annex G */ | 5 | |
|   else if( payloadType = = 35 ) | | |
|   tl_switching_point( payloadSize )/* specified in Annex G */ | 5 | |
|   else if( payloadType = = 36 ) | | |
|   parallel_decoding_info( payloadSize ) /* specified in Annex H */ | 5 | |
|   else if( payloadType = = 37 ) | | |
|   mvc_scalable_nesting( payloadSize ) /* specified in Annex H */ | 5 | |
| else if( payloadType = = 38 ) | | |
|   view_scalability_info( payloadSize ) /* specified in Annex H */ | 5 | |
| else if( payloadType = = 39 ) | | |
|   multiview_scene_info( payloadSize ) /* specified in Annex H */ | 5 | |
| else if( payloadType = = 40 ) | | |
|   multiview_acquisition_info( payloadSize ) /* specified in Annex H */ | 5 | |
| else if( payloadType = = 41 ) | | |
|   non_required_view_component( payloadSize ) /* specified in Annex H */ | 5 | |
| else if( payloadType = = 42 ) | | |
|   view_dependency_change( payloadSize ) /* specified in Annex H */ | 5 | |

TABLE 1-continued

SEI messages defined in H.264/AVC

| sei_payload( payloadType, payloadSize ) { | C | Descriptor |
|---|---|---|
| else if( payloadType = = 43 ) | | |
|   operation_points_not_present( payloadSize ) /* specified in Annex H */ | 5 | |
| else if( payloadType = = 44 ) | | |
|   base_view_temporal_hrd( payloadSize ) /* specified in Annex H */ | 5 | |
| else if( payloadType = = 45 ) | | |
|   frame_packing_arrangement( payloadSize ) | 5 | |
| else if( payloadType = = 46 ) | | |
|   multiview_view_position( payloadSize ) /* specified in Annex H */ | 5 | |
| else if( payloadType = = 47 ) | | |
|   display_orientation( payloadSize ) /* specified in Annex I */ | 5 | |
| else if( payloadType = = 48 ) | | |
|   mvcd_view_scalable_nesting( payloadSize ) /* specified in Annex I */ | 5 | |
| else if( payloadType = = 49 ) | | |
|   mvcd_view_scalability_info_( payloadSize ) /* specified in Annex I */ | 5 | |
| else if( payloadType = = 50 ) | | |
|   depth_representation_info( payloadSize ) | 5 | |
| else if( payloadType = = 51 ) | | |
|   three_dimensional_reference_displays_info( payloadSize ) /* specified in Annex I | | |
| else if( payloadType = = 52 ) | | |
|   depth_timing( payloadSize ) /* specified in Annex I */ | 5 | |
| else if( payloadType = = 53 ) | | |
|   depth_sampling_info( payloadSize ) | 5 | |
| else if( payloadType = = 54 ) | | |
|   complexity_estimator( payloadSize )/* specified for complexity estimation*/ | 5 | |
| else | | |
|   reserved_sei_message( payloadSize ) | 5 | |
| if( !byte_aligned( ) ) { | | |
|   bit_equal_to_one /* equal to 1 */ | 5 | f(1) |
|   while( !byte_aligned( ) ) | | |
|     bit_equal_to_zero /* equal to 0 */ | 5 | f(1) |
|   } | | |
| } | | |

TABLE 2

Complexity Estimator SEI Syntax: Embodiment 1

| complexity_estimator( payloadSize ) { | C | Descriptor |
|---|---|---|
| period_type | 5 | f(2) |
| if ( period_type == 2 ) { | | |
|   num_seconds | 5 | f(8) |
| } | | |
| if ( period_type == 3 ) { | 5 | |
|   num_frames | 5 | f(12) |
| } | | |
| num_non_zero_macroblocks | 5 | f(32) |
| num_intra_coded_macroblocks | 5 | f(32) |
| num_half_pel_interpolations | 5 | f(32) |
| num_alpha_point_deblocking_instances | 5 | f(32) |

TABLE 2.1

Complexity Estimator SEI Syntax: Embodiment 2

| complexity_estimator( payloadSize ) { | C | Descriptor |
|---|---|---|
| period_type | 5 | f(2) |
| if ( period type == 2 ) { | | |
|   num_seconds | 5 | f(8) |
| } | | |
| if ( period type == 3 ) { | | |
|   num_frames | 5 | f(12) |
| } | | |
| if (period type < 2 ) { | | |
|   num_non_zero_macroblocks | 5 | f(16) |
|   num_intra_coded_macroblocks | 5 | f(16) |
|   num_half_pel_interpolations | 5 | f(16) |
|   num_alpha_point_deblocking_instances | 5 | f(16) |
| } | | |

TABLE 2.1-continued

Complexity Estimator SEI Syntax: Embodiment 2

| complexity_estimator( payloadSize ) { | C | Descriptor |
|---|---|---|
| else { | | |
|   num_non_zero_macroblocks | 5 | f(32) |
|   num_intra_coded_macroblocks | 5 | f(32) |
|   num_half_pel_interpolations | 5 | f(32) |
|   num_alpha_point_deblocking_instances | 5 | f(32) |
| } | | |

TABLE 2.2

Complexity Estimator SEI Syntax: Embodiment 3

| complexity_estimator( payloadSize ) { | C | Descriptor |
|---|---|---|
| period type | 5 | f(11) |
| if ( period_typetype == 1 ) { | | |
|   num_seconds | 5 | f(8) |
|   num_frames | 5 | f(12) |
| } | | |
| if ( period_type == 0 ) { | | |
|   num_non_zero_macroblocks | 5 | f(16) |
|   num_intra_coded_macroblocks | 5 | f(16) |
|   num_half_pel_interpolations | 5 | f(16) |
|   num_alpha_point_deblocking_instances | 5 | f(16) |
| } | | |
| else { | | |
|   num_non_zero_macroblocks | 5 | f(32) |
|   num_intra_coded_macroblocks | 5 | f(32) |
|   num_half_pel_interpolations | 5 | f(32) |
|   num_alpha_point_deblocking_instances | 5 | f(32) |
| } | | |

TABLE 3

NALU syntax in H.264/AVC and its extensions

| nal_unit( NumBytesInNALunit) { | C | Descriptor |
|---|---|---|
| Forbidden_zero_bit | All | f(1) |
| Nal_ref_ide | All | u(2) |
| naI_unit_type | All | u(5) |
| NumBytesInRBSP = 0 | | |
| nalUnitHeaderBytes = 1 | | |
| if( nal_unit_type == 14 \|\| nal_unit_type == 20 \|\| | | |
|   nal_unit_type == 21) { | | |
|   svc_extension_flag | All | u(1) |
|   if( svc_extension_flag) | | |
|     nal_unit_header_svc_extension( ) /* specified in Annex G */ | All | |
|   else | | |
|     nal_unit_header_mvc_extension( ) /* specified in Annex H */ | All | |
|   nalUnitHeaderBytes += 3 | | |
| } | | |
| for( i = nalUnitHeaderBytes; i < NumBytesInNALunit; i++ ) { | | |
|   if( i + 2 < NumBytesInNALunit && next_bits( 24 ) == 0x000003) { | | |
|     rbsp_byte [ NumBytesInRBSP++ ] | All | b(8) |
|     rbsp_byte [ NumBytesInRBSP++ ] | All | b(8) |
|     i +=2 | | |
|     emulation_prevention_three_byte /* equal to 0x03 */ | All | f(8) |
|   } else | | |
|     rbsp_byte [ NumBytesInRBSP++ ] | All | b(8) |
|   } | | |
| } | | |

TABLE 4 nal_unit_type definitions in H.264/AVC

| nal_unit_type | Content of NAL unit and RBSP syntax structure | C | Annex A NAL unit type class | Annex G and Annex H NAL unit type class | Annex I NAL unit type class |
|---|---|---|---|---|---|
| 0 | Unspecified | | non-VCL | non-VCL | non-VCL |
| 1 | Coded slice of a non-IDR picture slice_layer_without_partitioning_rbsp( ) | 2, 3, 4 | VCL | VCL | VCL |
| 2 | Coded slice data partition A slice_data_partition_a_layer_rbsp( ) | 2 | VCL | not applicable | not applicable |
| 3 | Coded slice data partition B slice_data_partition_b_layer_rbsp( ) | 3 | VCL | not applicable | not applicable |
| 4 | Coded slice data partition C slice_data_partition_c_layer_rbsp( ) | 4 | VCL | not applicable | not applicable |
| 5 | Coded slice of an IDR picture slice_layer_without_partitioning_rbsp( ) | 2, 3 | VCL | VCL | VCL |
| 6 | Supplemental enhancement information (SEI) sei_rbsp( ) | 5 | non-VCL | non-VCL | non-VCL |
| 7 | Sequence parameter set seq_parameter_set_rbsp( ) | 0 | non-VCL | non-VCL | non-VCL |
| 8 | Picture parameter set Pic_parameter_set_rbsp( ) | 1 | non-VCL | non-VCL | non-VCL |
| 9 | Access unit delimiter access_unit_delimiter_rbsp( ) | 6 | non-VCL | non-VCL | non-VCL |
| 10 | End of sequence end_of_seq_rbsp( ) | 7 | non-VCL | non-VCL | non-VCL |
| 11 | End of stream end_of_stream_rbsp( ) | 8 | non-VCL | non-VCL | non-VCL |
| 12 | Filler data filler_data_rbsp( ) | 9 | non-VCL | non-VCL | non-VCL |
| 13 | Sequence parameter set extension Seq_parameter_set_extension_rbsp( ) | 10 | non-VCL | non-VCL | non-VCL |
| 14 | Prefix NAL unit prefix_nal_unit_rbsp( ) | 2 | non-VCL | suffix dependent | suffix dependent |
| 15 | Subset sequence parameter set subscrseqparameter_set_rbsp( ) | 0 | non-VCL | non-VCL | non-VCL |
| 16 ... 18 | Reserved | | non-VCL | non-VCL | non-VCL |
| 19 | Coded slice of an auxiliary coded picture without partitioning slice_layer_without_partitioning_rbsp( ) | 2, 3, 4 | non-VCL | non-VCL | non-VCL |
| 20 | Coded slice extension slice_layer_extension_rbsp( ) | 2, 3, 4 | non-VCL | VCL | VCL |

TABLE 4-continued nal_unit_type definitions in H.264/AVC

| nal_unit_type | Content of NAL unit and RBSP syntax structure | C | Annex A NAL unit type class | Annex G and Annex H NAL unit type class | Annex I NAL unit type class |
|---|---|---|---|---|---|
| 21 | Coded slice extension for depth view components /*specified in Annex I */ slice_layer_extension_rbsp( ) /* specified in Annex I */ | 2, 3, 4 | non-VCL | non-VCL | VCL |
| 22 ... 23 | Reserved | | non-VCL | non-VCL | VCL |
| 24 ... 31 | Unspecified | | non-VCL | non-VCL | non-VCL |

TABLE 5

Extended NAL unit syntax

| | C | Descriptor |
|---|---|---|
| nal_unit( NumBytesInNALunit) { | | |
|   forbidden_zero_bit | All | f(1) |
|   nal_ref_idc | All | u(2) |
|   nal_unit_type | All | u(5) |
|   NumBytesInRBSP = 0 | | |
|   nalUnitHeaderBytes = 1 | | |
|   if( nal_unit_type == 14 \|\| nal_unit_type == 20) { | | |
|     svc_extension_flag | All | u(1) |
|     if( svc_extension_flag ) | | |
|       nal_unit_header_svc_extension( ) /* specified in Annex G */ | All | |
|     Else | | |
|       nal_unit_header_mvc_extension( ) /* specified in Annex H */ | All | |
|     nalUnitHeaderBytes += 3 | | |
|   } | | |
|   if (nal_unit_type == 24 ){ | | |
|     period_type | All | u(2) |
|     if ( period_type == 2 ) { | | |
|       num_seconds | All | f(8) |
|     } | | |
|     if ( period_type == 3 ) { | All | |
|       num_frames | All | f(12) |
|     } | | |
|     if ( period_type < 2 ) { | | |
|       num_non_zero_macroblocks | All | f(16) |
|       num_intra_coded_macroblocks | All | f(16) |
|       num_half_pel_interpolations | All | f(16) |
|       num_alpha_point_deblocking_instances | All | f(16) |
|     } | | |
|     else { | | |
|       num_non_zero_macroblocks | All | f(32) |
|       num_intra_coded_macroblocks | All | f(32) |
|       num_half_pel_interpolations | All | f(32) |
|       num_alpha_point_deblocking_instances | All | f(32) |
|   } | | |
|   for( i = nalUnitHeaderBytes; i < NumBytesInNALunit; i++ ) { | | |
|     if( i + 2 < NumBytesInNALunit && next_bits( 24 ) == 0x000003 ) { | | |
|       rbsp_byte[ NumBytesInRBSP++ ] | All | b(8) |
|       rbsp_byte[ NumBytesInRBSP++ ] | All | b(8) |
|       i += 2 | | |
|       emulation_prevention_three_byte /* equal to 0x03 */ | All | f(8) |
|     } else | | |
|       rbsp_byte[ NumBytesInRBSP++ ] | All | b(8) |
|   } | | |
| } | | |

TABLE 6

Extended NAL unit type definition

| nal_unit_type | Content of NAL unit and RBSP syntax structure | C | Annex A NAL unit type class | Annex G and Annex H NAL unit type class |
|---|---|---|---|---|
| 0 | Unspecified | | non-VCL | non-VCL |
| 1 | Coded slice of a non-IDR picture<br>slice_layer_without_partitioning_rbsp( ) | 2, 3, 4 | VCL | VCL |
| 2 | Coded slice data partition A<br>slice_data_partition_a_layer_rbsp( ) | 2 | VCL | not applicable |
| 3 | Coded slice data partition B<br>slice_data_partition_b_layer_rbsp( ) | 3 | VCL | not applicable |
| 4 | Coded slice data partition C<br>slice_data_partition_c_layer_rbsp( ) | 4 | VCL | not applicable |
| 5 | Coded slice of an IDR picture<br>slice_layer_without_partitioning_rbsp( ) | 2, 3 | VCL | VCL |
| 6 | Supplemental enhancement information (SEI)<br>sei_rbsp( ) | 5 | non-VCL | non-VCL |
| 7 | Sequence parameter set<br>seq_parameter_set_rbsp( ) | 0 | non-VCL | non-VCL |
| 8 | Picture parameter set<br>pic_parameter_set_rbsp( ) | 1 | non-VCL | non-VCL |
| 9 | Access unit delimiter<br>access_unit_delimiter_rbsp( ) | 6 | non-VCL | non-VCL |
| 10 | End of sequence<br>end_of_seq_rbsp( ) | 7 | non-VCL | non-VCL |
| 11 | End of stream<br>end_of_stream_rbsp( ) | 8 | non-VCL | non-VCL |
| 12 | Filler data<br>filler_data_rbsp( ) | 9 | non-VCL | non-VCL |
| 13 | Sequence parameter set extension<br>seq_parameter_set_extension_rbsp( ) | 10 | non-VCL | non-VCL |
| 14 | Prefix NAL unit<br>prefix_nal_unit_rbsp( ) | 2 | non-VCL | suffix dependent |
| 15 | Subset sequence parameter set<br>subset_seq_parameter_set_rbsp( ) | 0 | non-VCL | non-VCL |
| 16 . . . 18 | Reserved | | non-VCL | non-VCL |
| 19 | Coded slice of an auxiliary coded picture without partitioning<br>slice_layer_without_partitioning_rbsp( ) | 2, 3, 4 | non-VCL | non-VCL |
| 20 | Coded slice extension<br>slice_layer_extension_rbsp( ) | 2, 3, 4 | non-VCL | VCL |
| 21 . . . 23 | Reserved | | non-VCL | non-VCL |
| 24 | Complexity Estimation<br>complexity_estimator( ) | | non-VCL | non-VCL |
| 25 . . . 31 | Unspecified | | non-VCL | non-VCL |

DVFS-Assisted Video Processing Using Complexity Model

Some operation systems (GNU/LINUX, ANDROID, and the like) provide DVFS functionality based on past workload sampling. These are typically generalized DVFS schemes, which do not carry the video content information. Hence, such DVFS schemes cannot adapt the voltage or frequency accurately for video processing. Accurate video complexity estimation based DVFS is required to guide the efficient voltage/frequency adaptation for energy saving.

As discussed hereinabove, video decoding frame complexity can be well-captured by embedding appropriate metadata (e.g., the number of non-zero macroblocks, the number of intra macroblocks, the number of half-interpolations, the number of alpha-point deblocking instances, and the like) for a fixed H.264/AVC software implementation. It is also desirable to have a generalized complexity prediction using metadata for all popular standard compliant video decoders, such as MPEG-2, H.264/AVC, as well as the emerging HEVC (high efficiency video coding), on either a software platform or a hardware platform.

Various embodiments below describe video complexity prediction models for DVFS. In the disclosed embodiments, model associated parameters are encapsulated (at the encoder or transmitter) as metadata in the video bitstream. The metadata is later parsed at the decoder (or receiver) to guide the DVFS.

There are two models described herein. The first model, denoted as MacroModel, is applicable to sequence-level and scene-level implementations. The second model, denoted as MicroModel, is usually applied in frame-level or GOP-level implementations, but may be applied in scene-level implementations as well.

Figure 7:
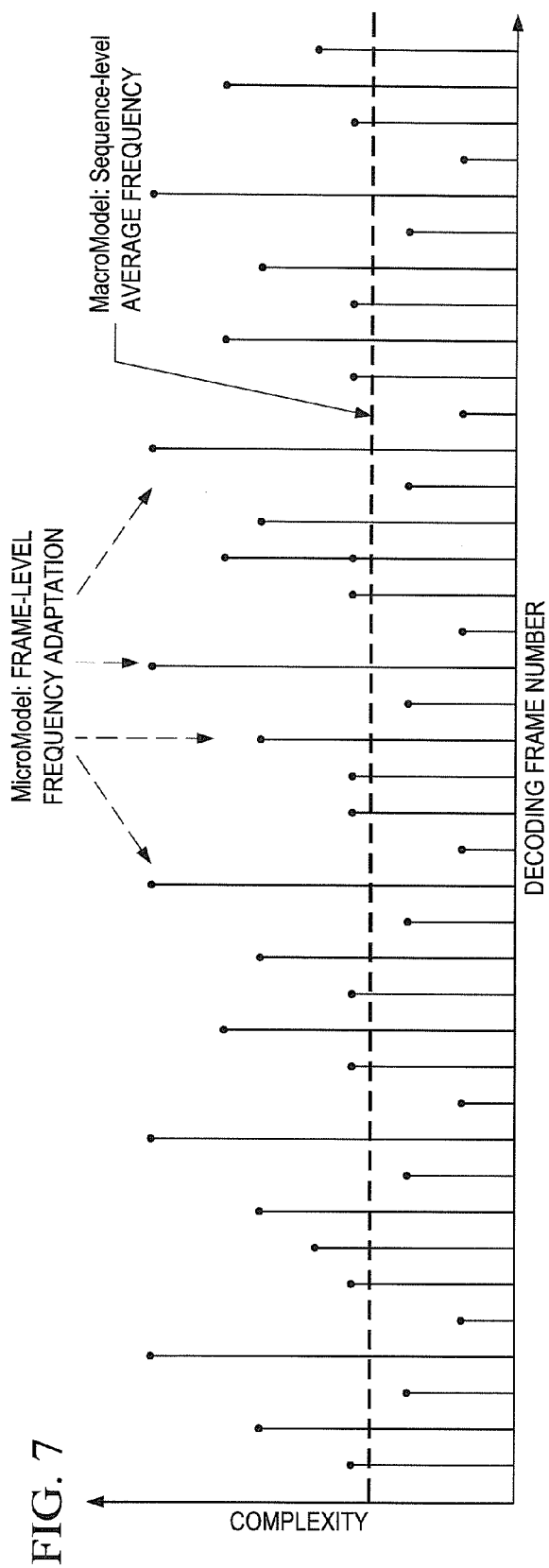
FIG. 7 illustrates MacroModel and MicroModel implementations of video complexity prediction, according to embodiments of this disclosure.

FIG. 7 illustrates both MacroModel and MicroModel implementations, according to embodiments of this disclosure. The embodiments illustrated in FIG. 7 are for illustration only. Other embodiments could be used without departing from the scope of this disclosure.

As shown in FIG. 7, at the receiver, the MacroModel first determines the average frequency or voltage for an incoming video sequence. This frequency or voltage is the initial value for the MicroModel based frame adaptation. MacroModel and MicroModel can be applied either jointly or separately. The MacroModel and MicroModel implementations will now be described in greater detail.

MacroModel

A compressed video signal can be characterized as a function of its frame size s, frame rate t, and quantization q (for example, bit rate and perceptual video quality). (See also REF6.) Hypothetically, video processing complexity can be expressed as a function of s, t, and q as well. Intuitively, 1080p video at 60 frames per second (fps) requires more cycles to process than 720p, or even 4-80p video at 30 fps. Also, a higher bit rate stream (coded with smaller quantization) use more cycles to decode than a lower bit rate video stream. Accordingly, the video processing complexity model may be expressed as:

$$C(s, t, q) = C_{max} \left(\frac{s}{s_{max}}\right)^c \left(\frac{t}{t_{max}}\right)^a \left(\frac{q}{q_{min}}\right)^{-b} \quad (2)$$

where $q_{min}$, $s_{max}$ and $t_{max}$ are chosen according to the underlying application, $C_{max}$ is the actual number of cycles associated with decoding a video at $q_{min}$, $s_{max}$ and $t_{max}$, and a, b and c are the model parameters.

Here, a, b, c and $C_{max}$ are content dependent parameters that are calculated using features of the video stream. Let $P=[a, b, c, C_{max}]^T$, and $F=[u_{MVM}, std_{MVM}, u_{MVD}, std_{MVD}, Sc, 1]^T$, where $u_{MVM}$ is the mean of the motion vector magnitude, $std_{MVM}$ is the standard deviation of the motion vector magnitude, $u_{MVD}$ is the mean of the motion vector direction, $std_{MVD}$ is the standard deviation of the motion vector direction, and Sc is the mean of content contrast. Then the following equation may be used to predict the model parameters:

$$P = HF, \quad (3)$$

where H is a weighting matrix which is fixed for typical coding structure (such as IPPP or IBBP) over different videos, $u_{MVM}$ is the mean of the motion vector magnitude, $std_{MVM}$ is the standard deviation of the motion vector magnitude, $u_{MVD}$ is mean of the motion vector direction, $std_{MVD}$ is the standard deviation of the motion vector direction and Sc is the mean of the content contrast. All these features are extracted from the original video at the encoder and embedded as the sequence-level metadata at the transmitter. Metadata F is parsed at the receiver to derive the MacroModel parameter using Equation (3). Then the average complexity for this video sequence is calculated using Equation (2).

In an embodiment, the weighting matrix H is derived through training and then implemented at the receiver without change. In another embodiment, a reasonable value of H is selected as a default, then the value is refined after decoding several test videos.

MicroModel

Bitstream decoding typically includes several or all of the following: bit parsing, buffer initialization, intra prediction (if applicable), inverse quantization & transform, reference block fetch, fractional reference block interpolation (if applicable), in-loop deblocking (if applicable), sample adaptive offset (if applicable), and adaptive loop filtering (if applicable).

Therefore, the total segment complexity can be generally represented by:

$$C_{total} = C_{bit\_parsing} + C_{buf\_init} + C_{itrans} + C_{intra} + C_{intp} +$$

$$C_{ref\_fetch} + C_{dblk} + C_{sao} + C_{alf} + C_{drf} \quad (4)$$

For each module, its complexity is proportional to the number of its unit operation (OP). More specifically, the complexity of the bit parsing is a linear function of the number of bits $n_{bit}$. The complexity of the buffer initialization is linearly related to the block numbers $n_{total}$ (4×4, or 8×8). The transform complexity is proportional to the non-zero blocks ($n_{total}-n_{zero}$). The complexity of the intra prediction is linearly related to the intra block number $n_{intra}$. The complexity of the interpolation is linearly related to the number of the interpolations required $n_{intp}$. The reference block fetch complexity is proportional to the image size or the total block number $n_{total}$. Both the deblocking and sample adaptive offset complexities depend on the number of pixels which require the filtering operations (i.e., $n_{dblk}$ and $n_{sao}$). The adaptive loop filter and de-ringing filter complexities are proportional to the number of blocks which require the filtering (i.e., $n_{alf}$ and $n_{drf}$). Hence, we can have:

$$C_{bit\_parsing} = k_{bit} n_{bit} \quad (5)$$

$$C_{buf\_init} = k_{buf\_init} n_{total} \quad (6)$$

$$C_{itrans} = k_{itrans}(n_{total} - n_{zero}) \quad (7)$$

$$C_{intra} = k_{intra} n_{intra} \quad (8)$$

$$C_{intp} = k_{intp} n_{intp} \quad (9)$$

$$C_{ref\_fetch} = k_{ref\_fetch} n_{total} \quad (10)$$

$$C_{dblk} = k_{dblk} n_{dblk} \quad (11)$$

$$C_{sao} = k_{sao} n_{sao} \quad (12)$$

$$C_{alf} = k_{alf} n_{alf} \quad (13)$$

$$C_{drf} = k_{drf} n_{drf} \quad (14)$$

where $n_{zero}$, $n_{intra}$, $n_{intp}$, $n_{dblk}$, $n_{sao}$, $n_{alf}$, and $n_{drf}$ can be derived from the encoding process and used to compute the various complexity metrics for the segment; $n_{bit}$ is known from the length of the bitstream segment which can be easily obtained; and $n_{total}$ can be derived using the image resolution and basic block size used in the standards. Correspondingly, $k_{bit}$, $k_{buf\_init}$, $k_{itrans}$, $k_{intra}$, $k_{intp}$, $k_{ref\_fetch}$, $k_{dblk}$, $k_{sao}$, $k_{alf}$ and $k_{drf}$ are unit operation complexity constants. These constants may be different for different implementations, and may be zero if the corresponding module is not supported by a certain standard (for example $k_{sao}$, $k_{alf}$, $k_{drf}$ are all zero for H.264/AVC standards). To enable accurate segment complexity computation, these unit operation complexity constants can be assigned with predetermined default values in the beginning, and then refined by decoding sample streams or using historical data for the same implementation.

Metadata Encapsulation

In an embodiment, MacroModel parameters associated with content features are embedded at the sequence level, such as the sequence parameter set (SPS), the video parameter set (VPS), supplemental enhancement information (SEI) messages, or the extension of the NALU (network abstraction layer unit).

In an embodiment, the MicroModel parameters are embedded into SEI or the extension of the NALU. As an example, the video content information is embedded using NALU header syntax. The NALU header syntax can be parsed at the decoder to support the complexity prediction so as to guide the DVFS for energy saving. These header messages are derived at the encoder during video encoding. The embodiments described herein comprise a software-implemented H.264/AVC decoder on the CPU. However, the embodiments are not limited thereto, and can also be applicable to a hardware codec.

NALU Extension

The DVFS enabling NALU header message (i.e., complexity_estimator( )) can be inserted into the bitstream on a frame-by-frame, GOP-by-GOP, scene-by-scene, or time-interval-by-time-interval basis, depending on the underlying applications. That is, the NALU header message can be inserted once at the start of each frame, GOP, scene, or time interval. In comparison to a frame-level inserted message, a GOP-interval, scene-interval, or time-interval inserted message requires less overhead for message insertion. For processors that don't support high-frequency DVFS (e.g., adapting at 33 ms for 30 Hz video playback), a GOP-interval, scene-interval, or time-interval based scheme may be advantageous to a frame-based scheme.

NALU definition and illustration were described above in FIG. 2. As shown in FIG. 2, a NALU 200 includes two parts, a NALU header 210 and a NALU payload 220. The NALU header 210 may be parsed at the decoder for decoding operations. For example, if the NALU header 210 indicates that the NALU 200 is a SPS (sequence parameter set) or a PPS (picture parameter set), then SPS or PPS parsing and initialization will be performed. Alternatively, if the NALU header 210 indicates that the NALU 200 is a slice NALU, then slice decoding is performed.

In H.264/AVC and its extensions, the NALU 200 is byte-aligned. The NALU header 210 may be either one (1) byte or four (4) bytes, depending on whether the NALU 200 is a regular single layer packet or a scalable packet. Table 3 shows the NALU syntax and its parsing process for H.264/AVC and its extensions.

Figure 3:
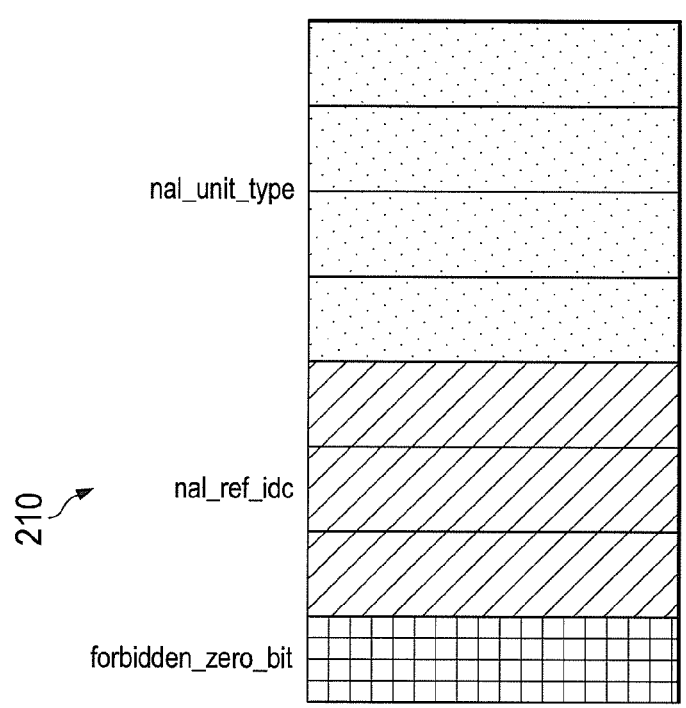
FIG. 3 illustrates a syntax for a NALU header.

As described in FIG. 3 above, a normal 1-byte NALU header includes a one-bit forbidden_zero_bit field (which is always zero), a three-bit nal_ref_idc field indicating whether the NALU can be referred, and a five-bit nal_unit_type field showing the exact type of the following NALU payload. If the nal_unit_type field has a value between 14 and 20 inclusive, an extra three bytes are parsed to derive additional information associated with H.264 scalable video. As shown in Table 4, H.264/AVC defines various nal_unit_type values for appropriate parsing and decoding, where values from 24 to 31 are unspecified.

In an embodiment, a new nal_unit_type=24 is defined as shown in Table 7. It will be understood that the value 24 is just one example value. Any available number can be selected. The new nal_unit_type in Table 7 is similar to the new nal_unit_type definition shown in Table 5; however, the nal_unit_type in Table 7 can support HEVC decoders. The new nal_unit_type=24 indicates the complexity associated information. When nal_unit_type=24, complexity_estimator( ) is used to parse and initialize the decoding complexity prediction related data. Each time the decoder parses the NALU header, the decoder enables a frame-level, GOP-level, scene-level, or time interval-level complexity estimation. The complexity metrics include the number of non-zero macroblocks, the number of intra coded macroblocks, the number of half-pel motion vectors, and the number of alpha point de-blocking instances, the number of sample adaptive offsets for HEVC, the number of adaptive loop filters for HEVC, and the number of dering filters for HEVC. Once all seven metrics in Table 7 are obtained, the decoder estimates the complexity for the next frame, GOP, scene, or time interval. This complexity is then used to adjust the voltage and frequency for the upcoming period. Table 7 and Table 6 (shown above) illustrate the modification to extend the current NALU header definition to support complexity information embedding in a wide variety of decoders, including HEVC decoders.

FIG. 4 illustrates the simplified parsing, complexity prediction, and DVFS control process for the NALU header message, while FIGS. 5 and 6 illustrate the frame-level and GOP-level NALU header encapsulation, respectively.

SEI Message

The video content information can also be embedded using SEI message syntax. The SEI message syntax can be parsed at the decoder to support the complexity prediction so as to guide the DVFS for energy saving. The SEI messages are derived at the encoder during video encoding.

The DVFS-enabling SEI message (e.g., complexity_estimator( )) can be inserted into the bitstream on a frame-by-frame, GOP-by-GOP, scene-by-scene, or even time-interval-by-time-interval basis, depending on the underlying applications. In comparison to a frame-level SEI message, a GOP-level, scene-level, or time-interval inserted message requires less overhead for message insertion. For processors that don't support high-frequency DVFS (e.g., adapting at 33 ms for 30 Hz video playback), a GOP-interval, scene-interval, or time-interval based scheme may be advantageous to a frame-based scheme.

In an embodiment, a new SEI message with payloadType=46 is defined as shown in Table 1 above. It will be understood that the value 46 is just one example. Any available number can be selected. Each time the decoder parses the SEI message, the decoder enables the frame-level, GOP-level, scene-level, or time-interval-level complexity estimation as defined in Table 8. Once we obtain all information, we can estimate the complexity for next coming frame, GOP (group of picture), scene, and time interval, and this complexity is used to adjust the voltage and frequency for upcoming period.

FIG. 4 illustrates the simplified parsing, complexity prediction, and DVFS control process for the SEI message, while FIGS. 5 and 6 illustrate the frame-level and GOP-level SEI message encapsulation, respectively.

TABLE 7

Extended NAL unit syntax

| nal_unit( NumBytesInNALunit ) { | C | Descriptor |
|---|---|---|
| forbidden_zero_bit | All | f(1) |
| nal_ref_idc | All | u(2) |
| nal_unit_type | All | u(5) |
| NumBytesInRBSP = 0 | | |
| nalUnitHeaderBytes = 1 | | |
| if( nal_unit_type == 14 \|\| nal_unit_type == 20 ) { | | |
| svc_extension_flag | All | u(1) |
| if( svc_extension_flag ) | | |

TABLE 7-continued

Extended NAL unit syntax

| nal_unit( NumBytesInNALunit ) { | C | Descriptor |
|---|---|---|
|     nal_unit_header_svc_extension( ) /* specified in Annex G */ | All | |
|   else | | |
|     nal_unit_header_mvc_extension( ) /* specified in Annex H */ | All | |
|   nalUnitHeaderBytes += 3 | | |
| } | | |
| if (nal_unit_type == 24 ){ | | |
|   num_non_zero_macroblocks | | u(16) |
|   num_intra_coded_macroblocks | | u(16) |
|   num_half_pel_interpolations | | u(16) |
|   num_alpha_point_deblocking_instances | | u(16) |
|   num_sample_adaptive_offset /*for HEVC*/ | | u(16) |
|   num_adaptive_loopfilter /*for HEVC extension*/ | | u(16) |
|   num_dering_filter /*for HEVC extension*/ | | u(16) |
| } | | |
| for( i = nalUnitHeaderBytes; i < NumBytesInNALunit; i++ ) { | | |
|   if( i + 2 < NumBytesInNALunit && next_bits( 24 ) == 0x000003) { | | |
|     rbsp_byte[ NumBytesInRBSP++ ] | All | b(8) |
|     rbsp_byte[ NumBytesInRBSP++ ] | All | b(8) |
|     i += 2 | | |
|     emulation_prevention_three_byte /* equal to 0x03 */ | All | f(8) |
|   } else | | |
|     rbsp_byte[ NumBytesInRBSP++ ] | All | b(8) |
|   } | | |
| } | | |

TABLE 8

Complexity Estimator SEI Syntax

| complexity_estimator( payloadSize ) { | C | Descriptor |
|---|---|---|
| num_non_zero_macroblocks | 5 | f(16) |
| num_intra_coded_macroblocks | 5 | f(16) |
| num_half_pel_interpolations | 5 | f(16) |
| num_alpha_point_deblocking_instances | 5 | f(16) |
| num_sample_adaptive_offset /*for HEVC*/ | 5 | f(16) |
| num_adaptive_loopfilter /*for HEVC extension*/ | 5 | f(16) |
| num_dering_filter /*for HEVC extension*/ | 5 | f(16) |

Figure 8:
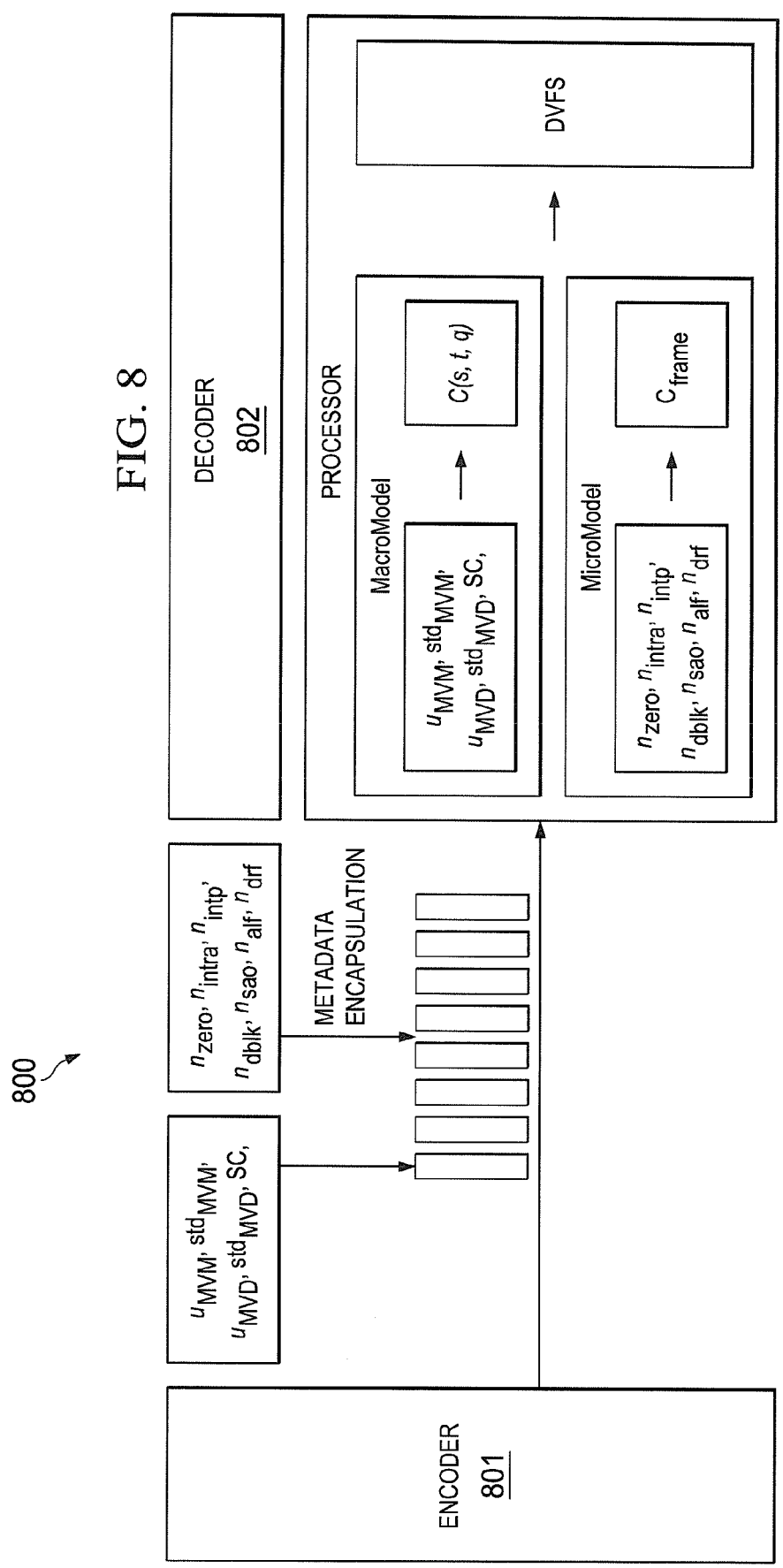
FIG. 8 illustrates a system architecture for an encoder and a decoder, according to an embodiment of this disclosure.

FIG. 8 illustrates a system architecture for an encoder and a decoder, according to an embodiment of this disclosure. The embodiment of the system architecture 800 illustrated in FIG. 8 is for illustration only. Other embodiments could be used without departing from the scope of this disclosure.

As used herein, the encoder 801 may be part of the transmitter and the decoder 802 may be part of the receiver. At the encoder 801, video content features are derived and embedded at the sequence level, which are then parsed at the decoder 802 to obtain the sequence level averaged complexity requirement. Encoding information, such as $n_{zero}$, $n_{intra}$, $n_{intp}$, $n_{dblk}$, $n_{sao}$, $n_{alf}$ and $n_{drf}$ are obtained during the encoding process and embedded appropriately in the bitstream for frame-level or GOP-level DVFS at the decoder 802. It is noted that MacroModel and MicroModel can be applied either jointly or separately.

The embodiments disclosed herein exemplify Micro-Model-based DVFS using an extended NALU header or SEI message. However, this disclosure is not limited thereto. In other embodiments, any information derived from the encoder can be embedded in a SEI message or extended NALU header to help the decoder DVFS. In still other embodiments, information can be derived by analyzing the underlying input video, such as motion activities, pixel histogram, contrasts, and the like.

Buffer Assisted DVFS

As discussed hereinabove, video decoding frame complexity can be well-captured by embedding appropriate metadata for complexity prediction and DVFS control frame-by-frame. However, current systems do not use a buffer to help the DVFS so as to achieve additional energy savings. Various embodiments of this disclosure describe use of a buffer to assist the DVFS for video decoding.

Figure 9:
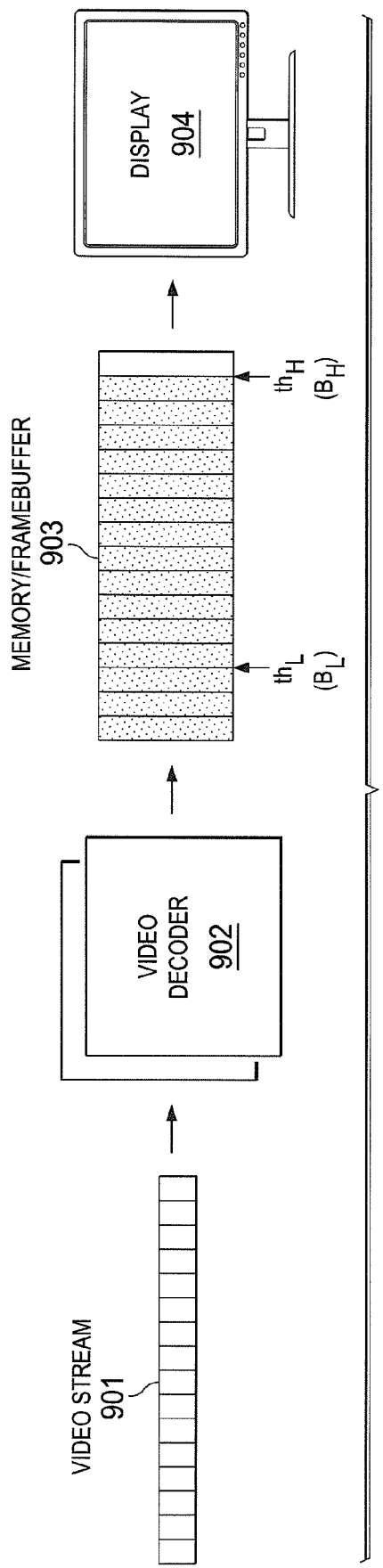
FIG. 9 illustrates a video stream at a decoder, according to an embodiment of this disclosure.

FIG. 9 illustrates a video stream at a receiver, according to an embodiment of this disclosure. The embodiment illustrated in FIG. 9 is for illustration only. Other embodiments could be used without departing from the scope of this disclosure.

As shown in FIG. 9, a video stream 901 is decoded at a video decoder 902 (the decoder 902 may include either a software implementation using the CPU or a hardware implementation using a dedicated ASIC). Reconstructed frames are piped or loaded into a memory or frame buffer 903 and rendered at a display screen 904 of the receiver.

Let $th_L$ and $th_H$ denote the low watermark and high watermark for the frame buffer 903, which corresponds to $B_L$ and $B_H$ bytes of data (i.e., frames) in memory. The number of frames can be derived using:

$$N = \frac{B}{a \cdot w \cdot h} \quad (15)$$

where B stands for the size of occupied memory in the buffer 903 (where B is targeted to be somewhere between $B_L$ and $B_H$), w and h are the width and height of the decoded video, and a is the video color format scaling factor (for many videos, a=1.5 for YUV420 format).

Initially, a delay may occur to fill the buffer to $th_H$. In some applications, this delay may be a couple of seconds. In many video streaming applications, there may already exist a delay of more than 10 seconds for one or more advertisements, thus a couple of seconds delay is reasonable. Let $t_{init}$ represent this short initial delay time. Accordingly, the clock rate should be set according to the following:

$$f_{init} = \frac{N_H \cdot C_{ave}}{t_{init}} \quad (16)$$

where $N_H$ is the total number of frames, and $C_{ave}$ is the average cycles requirements (or complexity) for decoding the $N_H$ frames. $C_{ave}$ can be easily estimated using the method proposed in REF1, or can be predicted using polynomial functions based on the stream bytes, where the polynomial coefficients are trained using history data, or can be accurately approximated using the cycle data derived at the encoder and embedded in the stream as metadata, as discussed above.

Figure 10:
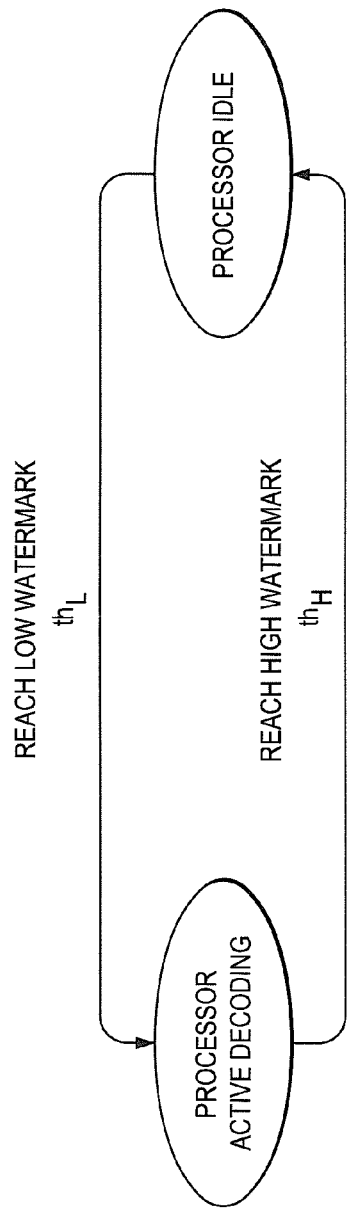
FIG. 10 illustrates a Markov state machine of a video decoder process, according to an embodiment of this disclosure.

Once the frame buffer 903 reaches the high watermark level $th_H$, the decoding processor 902 transitions to the idle state for sleep. During the decoder idle period, the display 904 continuously reads the data from the frame buffer 903 and controls the display panel for picture rendering. The decoding processor 902 transitions back to the active state once the buffer 903 gets to the low watermark $th_L$. The decoder 902 then decodes more video and makes the buffer 903 filled to $th_H$ again before buffer underflow. Before decoding more video, the clock rate of the decoder is assigned as:

$$f = \frac{N_H \cdot C_{ave}}{t_L}, t_L = \frac{B_L}{a \cdot w \cdot h} \quad (17)$$

where $B_L$ represents the occupied memory size at the low watermark $th_L$. $C_{ave}$ is updated for the following streams for decoding. The same procedure is iterated until the whole stream is completed. Therefore, the overall system can be depicted using a Markov state machine depending on the buffer status, as shown in FIG. 10.

Figure 11:
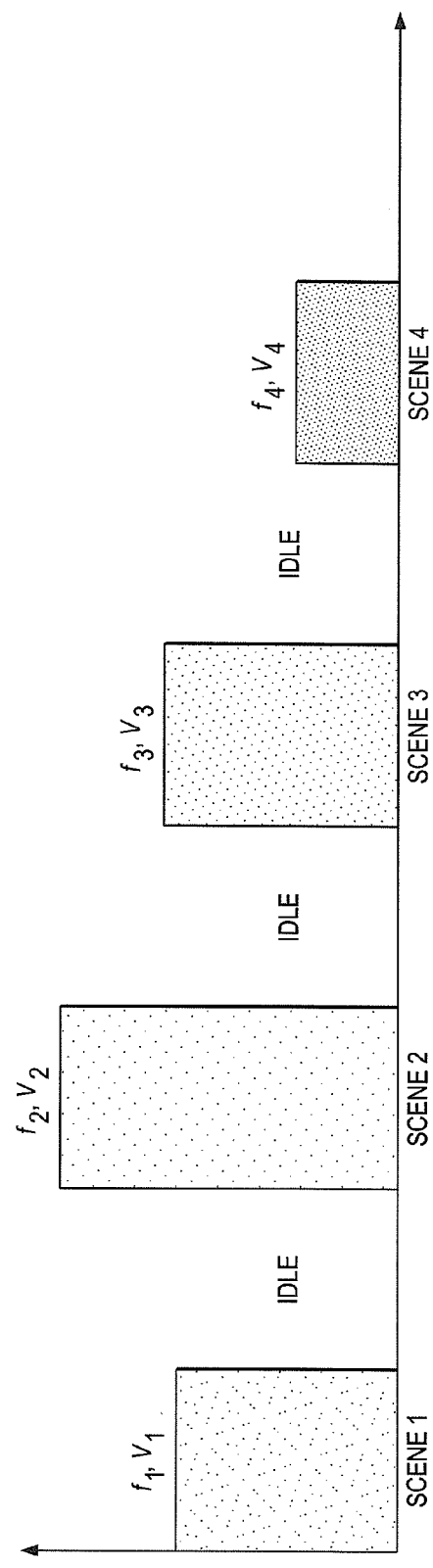
FIG. 11 illustrates variations of frequency and voltage among different scenes in a video, according to an embodiment of this disclosure.

Because there may be large variations in content among different video scenes, $C_{ave}$ may be very different for different scenes; this in turn may result in a different clock rate f and associated supply voltage V for each scene. For example, FIG. 11 illustrates a video with different scenes (indicated as Scene 1 through Scene 4), where for each scene i, a different $f_i$ and associated $V_i$ are assigned. As shown in FIG. 11, $f_2$ and $V_2$ correspond to the most complex scene, which requires the highest voltage and frequency.

The embodiments disclosed hereinabove exemplify buffer-assisted DVFS. However, this disclosure is not limited thereto. In other embodiments, other information derived from the encoder can be used to help the complexity estimation. In some embodiments, a finer granularity of threshold can be configured in the system, instead of using only the low watermark and high watermark. In some embodiments, the clock rate can be adapted instantly if the cycle requirements are known through the metadata.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for dynamic voltage/frequency scaling (DVFS) for video processing, the method comprising:
    parsing, at a decoder, a bitstream associated with a video to determine embedded information associated with a complexity of a first portion of the video;
    estimating, at the decoder, the complexity of the first portion of the video using the embedded information, the complexity is estimated according to the following equation:

$$C = k_{init} n_{MB} + k_{bit} n_{bit} + k_{nz} n_{nz} + k_{intra} n_{intra} + k_{six} n_{six} + k_\alpha n_\alpha$$

where C is the estimated complexity, $n_{MB}$ is a number of total macroblocks in the first portion of the video, $n_{bit}$ is a number of bits in the first portion of the video, $n_{nz}$ is a number of non-zero macroblocks in the first portion of the video, $n_{intra}$ is a number of intra coded blocks in the first portion of the video, $n_{six}$ is a number of half-pel interpolation in the first portion of the video $n_\alpha$ is a number of alpha-point deblocking in the first portion of the video, and constants $k_{init}$, $k_{bit}$, $k_{nz}$, $k_{intra}$, $k_{six}$, and $k_\alpha$ are unit complexity constants for performing macroblock initialization, one bit parsing, non-zero block transform and quantization, intra block prediction, inter-block half-pel interpolation, and deblock alpha points filtering, respectively;
    determining, at the decoder, a voltage and frequency—to be used for decoding the first portion of the video based on the estimated complexity; and
    decoding, at the decoder, the first portion of the video at the determined voltage and frequency.

2. The method of claim 1, wherein the embedded information is embedded in a supplemental enhancement information (SEI) message in the bitstream.

3. The method of claim 2, wherein the SEI message comprises a payloadType field having a value=54.

4. The method of claim 1, wherein the embedded information is embedded in a network abstraction layer unit (NALU) header message in the bitstream.

5. The method of claim 4, wherein the NALU header message comprises a nal_unit_type field having a value of 24.

6. The method of claim 1, wherein the first portion of the video is a frame, a group of pictures (GOP), a scene, or a portion defined by a time interval.

7. The method of claim 1, wherein the decoder is a high efficiency video coding (HEVC) decoder and the embedded information comprises video sequence-level parameters and parameters specific to the first portion of video.

8. The method of claim 7, wherein the decoder comprises hardware configured to include a plurality of distinct clock domains, wherein clock frequencies of each distinct clock domain of the plurality of distinct clock domains are proportioned to achieve fine-grained voltage/frequency scaling.

9. An apparatus for dynamic voltage/frequency scaling (DVFS) for video processing, the apparatus comprising:
    a video decoder configured to:
        parse a bitstream associated with a video to determine embedded information associated with a complexity of a first portion of the video;
        estimate the complexity of the first portion of the video using the embedded information, the complexity is estimated according to the following equation:

$$C = k_{init} n_{MB} + k_{bit} n_{bit} + k_{nz} n_{nz} + k_{intra} n_{intra} + k_{six} n_{six} + k_\alpha n_\alpha$$

where C is the estimated complexity, $n_{MB}$ is a number of total macroblocks in the first portion of the video, $n_{bit}$ is a number of bits in the first portion of the video, $n_{nz}$ is a number of non-zero macroblocks in the first portion of the video, $n_{intra}$ is a number of intra coded blocks in the first portion of the video, $n_{six}$ is a number of half-pel interpolation in the first portion of the video, $n_\alpha$ is a number of alpha-point deblocking in the first portion of the video, and constants $k_{init}$, $k_{bit}$, $k_{nz}$, $k_{intra}$, $k_{six}$, and $k_\alpha$ are unit complexity constants for performing macroblock initialization, one bit parsing, non-zero block transform and quantization, intra block prediction, inter-block half-pel interpolation, and deblock alpha points filtering, respectively;
determine a voltage to be used for decoding the first portion of the video based on the estimated complexity; and
decode the first portion of the video at the determined voltage and frequency.

10. The apparatus of claim 9, wherein the embedded information is embedded in a supplemental enhancement information (SEI) message in the bitstream.

11. The apparatus of claim 10, wherein the SEI message comprises a payloadType field having a value=54.

12. The apparatus of claim 9, wherein the embedded information is embedded in a network abstraction layer unit (NALU) header message in the bitstream.

13. The apparatus of claim 12, wherein the NALU header message comprises a nal_unit_type field having a value of 24.

14. The apparatus of claim 9, wherein the first portion of the video is a frame, a group of pictures (GOP), a scene, or a portion defined by a time interval.

15. The apparatus of claim 9, wherein the video decoder is a high efficiency video coding (HEVC) decoder and the embedded information comprises video sequence-level parameters and parameters specific to the first portion of video.

16. The apparatus of claim 9, wherein the decoder comprises hardware configured to include a plurality of distinct clock domains, wherein clock frequencies of each distinct clock domain of the plurality of distinct clock domains are proportioned to achieve fine-grained voltage/frequency scaling.

17. A method for buffer-assisted dynamic voltage/frequency scaling (DVFS) for video processing, the method comprising:
determining, at a video receiver, a first clock frequency to be used for decoding a first portion of a video based on an estimated complexity of the first portion of the video, the complexity is estimated according to the following equation:

$$C = k_{init} n_{MB} + k_{bit} n_{bit} + k_{nz} n_{nz} + k_{intra} n_{intra} + k_{six} n_{six} + k_\alpha n_\alpha$$

where C is the estimated complexity, $n_{MB}$ is a number of total macroblocks in the first portion of the video, $n_{bit}$ is a number of bits in the first portion of the video, $n_{nz}$ is a number of non-zero macroblocks in the first portion of the video, $n_{intra}$ is a number of intra coded blocks in the first portion of the video, $n_{six}$ is a number of half-pel interpolation in the first portion of the video, $n_\alpha$ is a number of alpha-point deblocking in the first portion of the video, and constants $k_{init}$, $k_{bit}$, $k_{nz}$, $k_{intra}$, $k_{six}$, and $k_\alpha$ are unit complexity constants for performing macroblock initialization, one bit parsing, non-zero block transform and quantization, intra block prediction, inter-block half-pel interpolation, and deblock alpha points filtering, respectively;
decoding, at the video receiver, the first portion of the video at the first clock frequency;
loading, by the video receiver, the first portion of the video into a frame buffer until the frame buffer reaches a high threshold;
displaying, at the video receiver, some of the first portion of the video stored in the frame buffer until the frame buffer reaches a low threshold;
changing, at the video receiver, to a second clock frequency; and
decoding, at the video receiver, a second portion of the video at the second clock frequency and loading the second portion of the video into the frame buffer.

18. The method of claim 17, wherein the first clock frequency is determined according to the following equation:

$$f_{init} = \frac{N_H \cdot C_{ave}}{t_{init}}$$

where $f_{init}$ is the first clock frequency, $N_H$ is a number of frames associated with the high threshold of the frame buffer, $C_{ave}$ is the estimated complexity of the first portion of the video, and $t_{init}$ is an initial delay time associated with loading the frame buffer to the high threshold.

19. The method of claim 17, wherein the second clock frequency is determined according to the following equation:

$$f = \frac{N_H \cdot C_{ave}}{t_L}, \quad t_L = \frac{B_L}{a \cdot w \cdot h}$$

where f is the second clock frequency, $N_H$ is a number of frames associated with the high threshold of the frame buffer, $C_{ave}$ is an estimated complexity of the second portion of the video, $B_L$ is an occupied memory size of the frame buffer at a low watermark $th_L$, a is a video color format scaling factor, and w and h are a width and height of the video.

20. The method of claim 17, further comprising:
parsing, at the video receiver, a bitstream associated with the video to determine embedded information associated with the estimated complexity of the first portion of the video; and
determining, at the video receiver, the estimated complexity of the first portion of the video using the embedded information.

* * * * *